(12) United States Patent
Czajkowski et al.

(10) Patent No.: US 7,165,255 B2
(45) Date of Patent: Jan. 16, 2007

(54) METHOD AND APPARATUS FOR MANAGING SURPLUS MEMORY IN MULTITASKING SYSTEM

(75) Inventors: Grzegorz J. Czajkowski, Mountain View, CA (US); Laurent P. Daynes, St-Ismier (FR)

(73) Assignee: Sun Microsystems, Inc., Santa Clara, CA (US)

( * ) Notice: Subject to any disclaimer, the term of this patent is extended or adjusted under 35 U.S.C. 154(b) by 796 days.

(21) Appl. No.: 09/884,291

(22) Filed: Jun. 18, 2001

(65) Prior Publication Data

US 2002/0133533 A1 Sep. 19, 2002

Related U.S. Application Data

(60) Provisional application No. 60/276,409, filed on Mar. 15, 2001.

(51) Int. Cl.
*G06F 9/50* (2006.01)
*G06F 9/455* (2006.01)
*G06F 12/00* (2006.01)

(52) U.S. Cl. .................. 718/104; 718/1; 711/150; 711/170; 707/206

(58) Field of Classification Search .......... 718/1, 718/100–108; 711/1–221; 707/206
See application file for complete search history.

(56) References Cited

U.S. PATENT DOCUMENTS 6,363,410 B1 * 3/2002 Kanamori et al. .......... 718/104

| | | | |
|---|---|---|---|
| 6,785,888 B1 * | 8/2004 | McKenney et al. | 718/104 |
| 2002/0091904 A1 * | 7/2002 | Haggar et al. | 711/170 |
| 2002/0099765 A1 * | 7/2002 | Otis | 709/203 |
| 2002/0108025 A1 * | 8/2002 | Shaylor | 711/203 |

OTHER PUBLICATIONS

David Ungar, "Generation Scavenging: A Non-Disruptive High Performance Storage Reclamation Algorithm", ACM SIGPLAN Notices 19(5), pp. 157-167 (Apr. 1984).*
Chan, Siu Yuen et al. "Recycling in Gardens: Efficient Memory Management for a Parallel System." Fifth Australiasian Conference on Parallel and Real-time Systems, Adelaide, Australia, Sep. 30, 1998.*

* cited by examiner

*Primary Examiner*—Lewis A. Bullock, Jr.
(74) *Attorney, Agent, or Firm*—Park, Vaughan & Fleming LLP; Edward J. Grundler (57) ABSTRACT

One embodiment of the present invention provides a system for managing surplus memory in a multitasking system. The system operates by reserving a guaranteed amount of memory from a heap for a task. Heap memory not reserved for a task is surplus memory. When the system receives a request from the task to allocate memory for a new object, the system determines if memory is available within the guaranteed amount of memory. If so, the system allocates memory for the new object from the guaranteed memory. Otherwise, if available, the system reserves an additional amount of memory to the task from surplus memory in the heap. The system then allocates memory for the new object from the additional amount of memory. Allocating memory for the new object from the additional amount of memory delays garbage collection of the memory. Surplus memory can be transparently reclaimed.

21 Claims, 5 Drawing Sheets

METHOD AND APPARATUS FOR MANAGING SURPLUS MEMORY IN MULTITASKING SYSTEM

RELATED APPLICATION

This application hereby claims priority under 35 U.S.C. §119 to a Provisional Patent Application entitled, "The Design of MVM—a Multitasking Virtual Machine," filed Mar. 15, 2001 by inventors Grzegorz J. Czajkowski and Laurent P. Daynes (Application No. 60/276,409).

BACKGROUND

1. Field of the Invention

The present invention relates to computer memory. More specifically, the present invention relates to a method and an apparatus for managing surplus memory in a multitasking system.

2. Related Art

Modern computing devices must be able to manage computational resources, such as central processing unit (CPU) time, memory, or the number of threads allowed to a task, in order to guarantee that certain amounts of resources are available for tasks. Controlling and managing heap memory is one of the hardest, if not the hardest, problem in this area, mostly because of the difficulties associated with revoking or reclaiming memory from an uncooperative task. This is much harder than, for example, revoking CPU time, which may be as easy as not giving the offending task more CPU time.

Typically, when a task needs storage space for a new object, a memory management system within the computing system allocates memory to the task from a heap. At some time after the task releases the allocated memory, the memory management system reclaims the memory using a garbage collector.

Modern garbage collection systems typically move data to make allocation faster and to improve data locality. Garbage collection is often performed using generational techniques, where long-lived (also known as old or tenured) data is moved around less frequently, and new (young) objects are allocated in a new (young) generation where they either die quickly or are moved around to finally get promoted (tenured) to an old generation.

Figure 1:
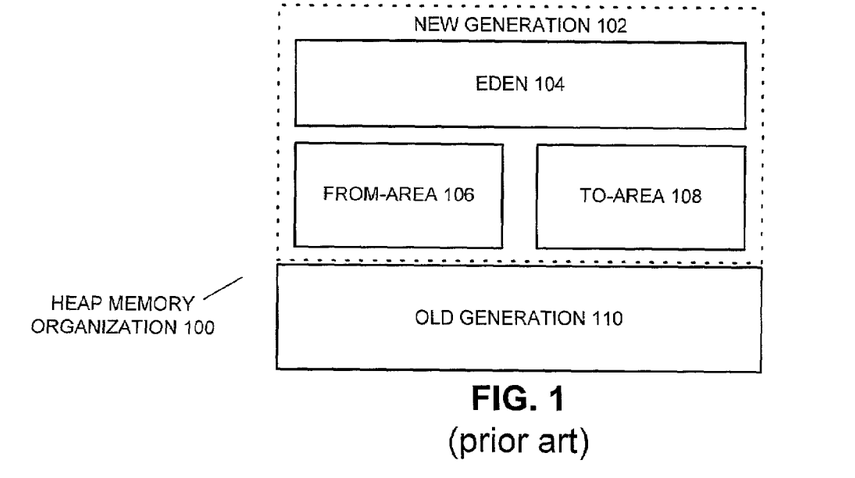
FIG. 1 illustrates heap memory organization 100 when using a generational garbage collector.

FIG. 1 illustrates heap memory organization 100 of a typical generational garbage collector. Heap memory organization 100 is divided into old generation 110 and new generation 102. New generation 102 follows a design suggested by Ungar, (Ungar, D., "Generation Scavenging: A Non-Disruptive High Performance Storage Reclamation Algorithm", ACM SIGPLAN Notices 19(5), April 1984), and is sub-divided into the creation space eden 104, and an aging space, consisting of from-area 106 and to-area 108.

New objects are initially allocated in eden 104, except for large arrays, which are allocated directly in old generation 110. When the new space is garbage collected (scavenged), the survivors from eden 104 are copied into to-area 108 along with objects from from-area 106, whose age is below an established threshold. Mature objects (i.e. with age above or equal to a threshold) are copied to old generation 110. This threshold is established to give optimum performance for the garbage collector and is typically several cycles of garbage collection. The age of each object in to-area 108 is incremented and, finally, the roles of to-area 108 and from-area 106 are swapped.

Garbage collection on old generation 110 is triggered when old generation 110 fills up. Old generation 110 typically fills up and triggers a collection less frequently than new generation 102, because only objects surviving several collections of new generation 102 are allocated in old generation 110.

Using a generational garbage collector as described above in conjunction with a multitasking virtual machine (MVM), however, presents problems. Allocating heap memory for multiple tasks in MVM requires that each object be tagged with a parent task identifier, which can lead to space overheads. It is also difficult to determine the amount of memory that is allocated to a specific task within MVM and, therefore, difficult to determine that a task has used more memory than it is allowed. Additionally, garbage collection requires all tasks in MVM to be suspended during garbage collection so that memory operations by a task do not interfere with the garbage collector.

Memory reservations can solve the problem but leads to wasteful memory management, since memory currently not used as guaranteed memory for any task is not used by any task. This unused memory is termed "surplus memory."

Since heap memory is a precious resource in languages with automatic memory management, what is needed is a method and an apparatus to enable the utilization of surplus memory at all times.

SUMMARY

One embodiment of the present invention provides a system for managing surplus memory in a multitasking system. The system operates by reserving a guaranteed amount of memory for a task from heap in the multitasking system. When the system receives a request from the task to allocate memory for a new object, the system determines if memory is available within this guaranteed amount of memory. If so, the system allocates memory for the new object from the guaranteed amount of memory. Otherwise, if surplus memory is available in the heap in addition to memory allocated to tasks, the system reserves an additional amount of memory to the task from the heap. The system then allocates memory for the new object from the additional amount of memory. Allocating memory for the new object from the additional amount of memory delays garbage collection of the memory.

In one embodiment of the present invention, if surplus memory is not available in the heap in addition to memory allocated to tasks, the system performs a garbage collection on memory to reclaim unused reserved memory. The system then allocates memory for the new object from the reclaimed memory.

In one embodiment of the present invention, reserving the guaranteed amount of memory from the heap includes determining if there is sufficient memory available in the heap. If there is not sufficient memory in the heap, the system performs a garbage collection to reclaim allocated surplus memory. The system then reserves memory for the task from reclaimed memory.

In one embodiment of the invention, surplus memory can be quickly and transparently reclaimed if needed to be reserved memory for another task.

In one embodiment of the present invention, memory in the heap is managed using a generational garbage collector.

In one embodiment of the present invention, several tasks share an old generation of the generational garbage collector.

In one embodiment of the present invention, each task has a separate new generation of the generational garbage collector.

In one embodiment of the present invention, the generational garbage collector is a copying garbage collector.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 2:
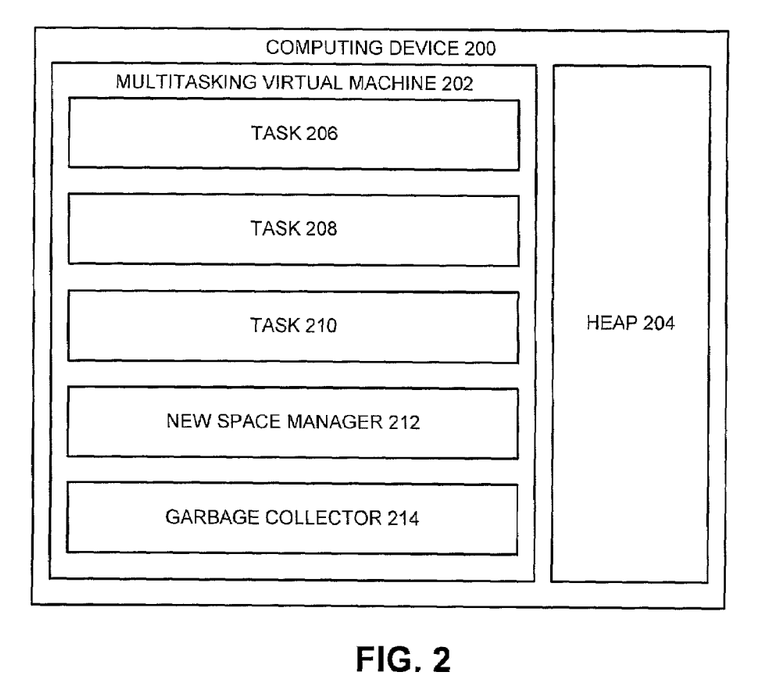
FIG. 2 illustrates computing device 200 in accordance with an embodiment of the present invention.

FIG. 2 illustrates computing device 200 in accordance with an embodiment of the present invention. Computing device 200 can generally include any type of computer system, including, but not limited to, a computer system based on a microprocessor, a mainframe computer, a digital signal processor, a portable computing device, a personal organizer, a device controller, and a computational engine within an appliance. Computing device 200 includes multitasking virtual machine 202 and heap 204.

Multitasking virtual machine 202 includes tasks 206, 208, and 210, new space manager 212 and garbage collector 214. Tasks 206, 208, and 210 are representative tasks running on multitasking virtual machine 202. The actual number of tasks can be more or less than the number shown in FIG. 2. New space manager 212 manages new generation space 302 of heap 204 as described below in conjunction with FIGS. 3 through 7. Garbage collector 214 reclaims unused memory within heap 204. Garbage collector 214 can use different algorithms, each optimized for either shared old generation 304 or for a task space within new generation space 302.

Heap Organization

Figure 3:
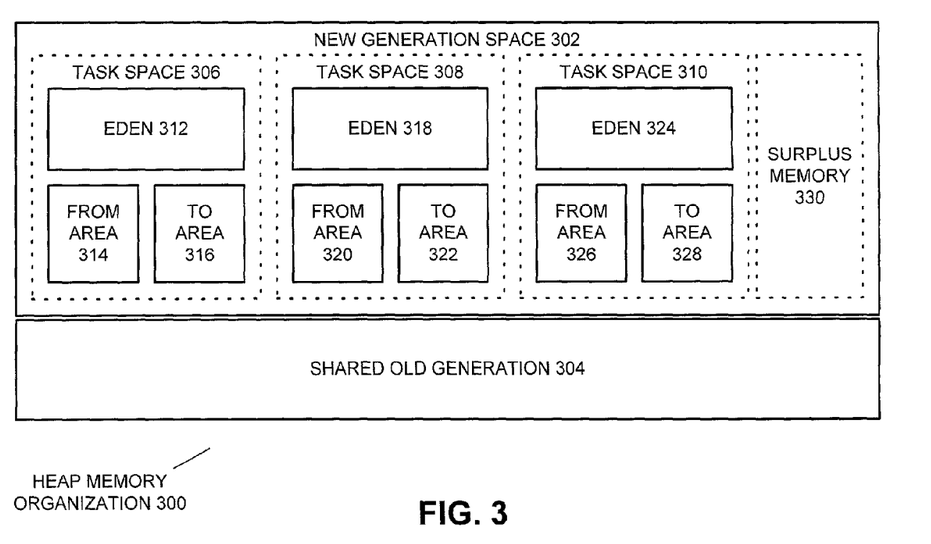
FIG. 3 illustrates heap memory organization 300 in accordance with an embodiment of the present invention.

FIG. 3 illustrates heap memory organization 300 in accordance with an embodiment of the present invention. Heap 204 is organized as shared old generation 304 and new generation space 302. Shared old generation 304 is shared by all tasks running on multitasking virtual machine 202. Since most new objects do not survive long enough to be placed in shared old generation 304, garbage collection of shared old generation 304 is infrequent.

New generation space 302 includes task spaces 306, 308, and 310 and surplus memory 330. Task spaces 306, 308, and 310 relate to tasks 206, 208, and 210 respectively. In general, each task within multitasking virtual machine 202 has a corresponding task space within new generation space 302. Task spaces 306, 308, and 310 include edens 312, 318, 324, from-areas 314, 320, and 326, and to-areas 316, 322, and 328 respectively. Additional task spaces for additional tasks are organized in the same manner as task spaces 306, 308, and 310.

An individual task space, for example task space 308 related to task 208, is separate from all other task spaces allowing garbage collector 214 to scavenge memory for an individual task. In addition, since the root of the individual task space is within the task, no memory is devoted to specifying which task owns an object within new generation space 302.

Memory Usage and Limits

Figure 4A:
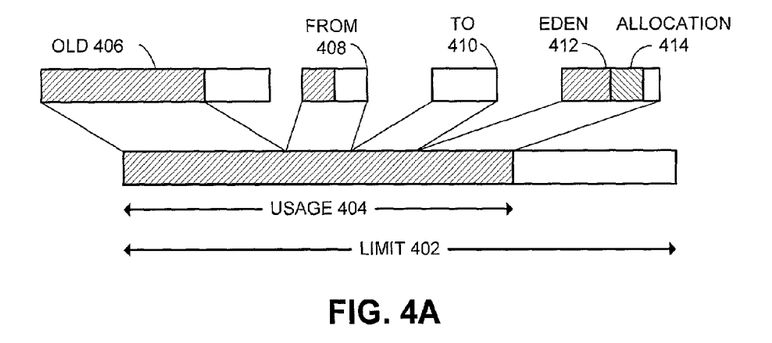
FIG. 4A illustrates memory usage and limits when adding allocation 414 in accordance with an embodiment of the present invention.

FIG. 4A illustrates memory usage and limits when adding allocation 414 in accordance with an embodiment of the present invention. New space manager 212 reserves memory for a task space from new generation space 302 and establishes limit 402 for the task. Limit 402 is an upper bound of memory that can be used by the respective task. Exceeding the limit can trigger a call-back (not shown) to new space manager 212 for resolution. Resolution can include reallocation of memory or termination of the task.

At any given time, memory usage 404 includes objects allocated in shared old generation 304, for example old 406 plus the size of from 408, to 410, and eden 412. Since usage 404 includes all of eden 412, a new allocation 414 does not change usage 404. Usage 404 is changed only when garbage collector 214 scavenges the associated task space and promotes an object to old 406.

Figure 4B:
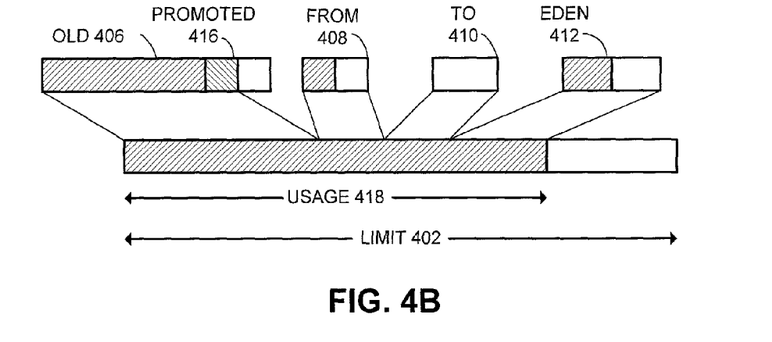
FIG. 4B illustrates memory usage and limits when adding promoted 416 to old 406 in accordance with an embodiment of the present invention.

FIG. 4B illustrates memory usage and limits when adding promoted 416 to old 406 in accordance with an embodiment of the present invention. When new space manager 212 scavenges the task space associated with a task, an object or objects can be promoted to old 406. These promoted objects are illustrated as promoted 416 in FIG. 4B. Usage 418 includes promoted 416, while limit 402 remains unchanged and continues to establish an upper bound for memory used by the related task.

New Space Memory

Figure 5A:
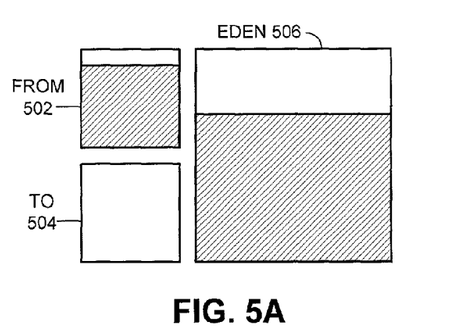
FIG. 5A illustrates new space memory use in accordance with an embodiment of the present invention.

FIG. 5A illustrates new space memory use in accordance with an embodiment of the present invention. When a task is started, new space manager 212 reserves memory from new generation space 302 for the task. The amount of memory reserved can depend on the task type, memory availability, task priority, and the like. The task is also assigned a priority for using surplus memory 330. This priority is established for the task based on the task type and the task's timing requirement to resume operation after scavenging by garbage collector 214. If the task cannot be suspended for long periods of time for scavenging, its priority for using surplus memory 330 is set to a low value or zero.

The reserved memory is divided into eden 506, from 502, and to 504. In general, objects are allocated and promoted within this reserved memory as described above in conjunction with FIG. 1. Each task, however, has its own reserved memory, which can be scavenged by garbage collector 214 irrespective of the state of other tasks. Therefore, other tasks do not need to be suspended during scavenging.

Figure 5B:
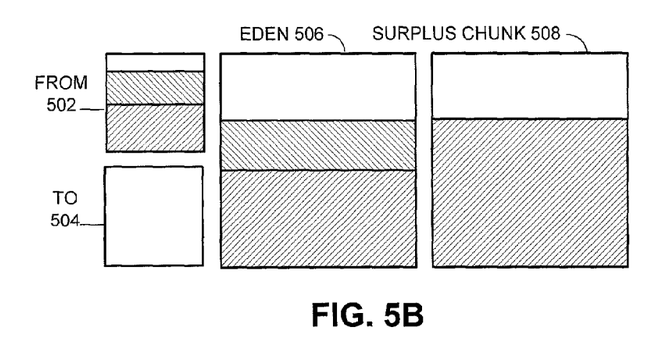
FIG. 5B illustrates new space memory use including surplus memory in accordance with an embodiment of the present invention.
Figure 5C:
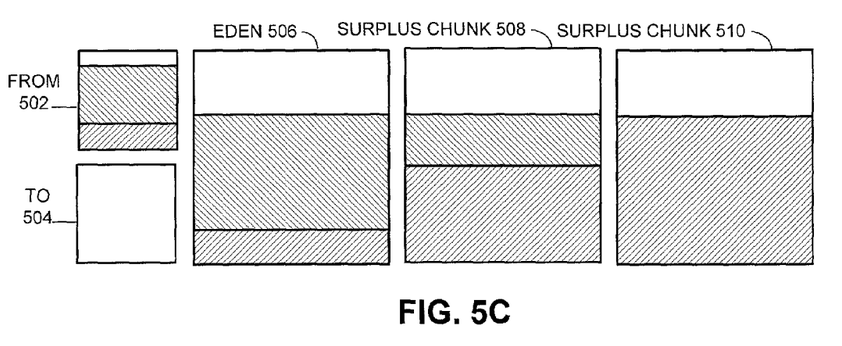
FIG. 5C illustrates new space memory use including additional surplus memory in accordance with an embodiment of the present invention.

Eden 506 and from 502, in general, contain both alive objects and dead objects as illustrated by the legend accompanying FIG. 5. Typically, when the associated task requests allocation of memory for a new object, new space manager 212 allocates the memory from eden 506. However, a request to allocate memory for an object that exceeds the memory available in eden 506 can trigger one of several options within new space manager 212. If the task has a sufficiently high priority for using surplus memory 330, new space manager can temporarily assign a surplus chunk of memory from surplus memory 330 as described below in conjunction with FIGS. 5B, 5C and 7. If the task priority for using surplus memory 330 is too low, or if there is no surplus memory 330, new space manager 212 can signal garbage collector 214 to scavenge the task space associated with the task that requested allocation of the object.

FIG. 5B illustrates new space memory use including surplus memory in accordance with an embodiment of the present invention. If the task has a sufficiently high priority for using surplus memory 330 when there is insufficient memory to allocate a new object in eden 506, new space manager 212 can allocate surplus chunk 508 to the task from surplus memory 330. This has the effect of delaying garbage collection within the task space of new generation space 302. New allocations continue in surplus chunk 508 just as they did within eden 506. Dead objects continue to accumulate within the memory reserved to the task space.

FIG. 5C illustrates new space memory use including additional surplus memory in accordance with an embodiment of the present invention. New space manager 212 can continue to reserve memory from surplus memory 330 as illustrated by surplus chunk 510. This reservation of memory from surplus memory 330 can continue as long as the task has a sufficiently high priority for using surplus memory 330, memory remains available in surplus memory 330, and the reserved surplus memory chunk is not needed to give a new task its reserved memory from new generation space 302. Note that memory reserved from surplus memory 330 does not impact the tasks limit and usage. The limit is established when the task is started and the limit is updated only when objects are promoted to shared old generation 304.

When a task cannot receive a surplus memory chunk from surplus memory 330 for any of the reasons listed above, new space manager 212 triggers a garbage collection by garbage collector 214. After the garbage collection, if the usage for the task does not exceed the limit for the task, the tasks new space is as illustrated in FIG. 5A. If the usage does exceed the limit for the task, new space manager 212 can respond in an appropriate manner, including terminating the offending task.

Allowing the task to use surplus memory 330 in the manner described can delay scavenging cycles on the task space assigned to the task from new generation space 302, thereby allowing more objects to die before triggering a garbage collection. Since garbage collector 214 copies objects from eden 506, surplus chunks 508 and 510, and from 502 into to 504, allowing more objects to die before triggering garbage collection results in less copying and more efficient use of CPU time. This improves memory utilization without causing problems related to memory reservations, since surplus memory can be quickly reclaimed. Since surplus memory extends eden, where objects are initially allocated and then either become unreachable quickly or are copied out of eden, surplus memory can be quickly and transparently reclaimed.

To properly age objects copied during garbage collection, objects are aged according to where the object was located during the garbage collection cycle. For example, objects from surplus chunk 510 are aged once (i.e. their age is incremented by one), objects from surplus chunk 508 are aged twice, and objects from eden 506 are aged three times.

Reserving Memory

Figure 6:
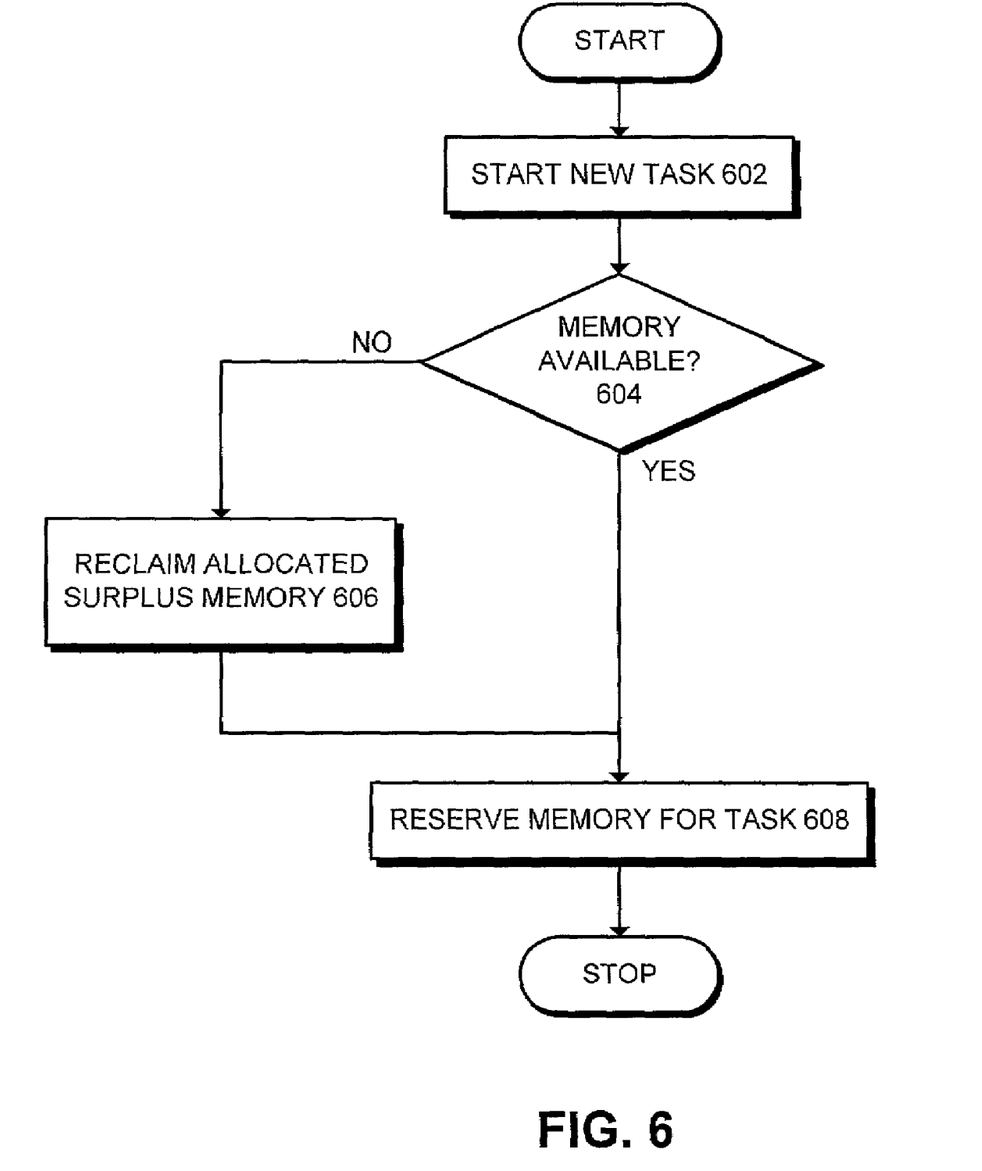
FIG. 6 is a flowchart illustrating the process of reserving memory for a task in accordance with an embodiment of the present invention.

FIG. 6 is a flowchart illustrating the process of reserving memory for a task in accordance with an embodiment of the present invention. The system starts when multitasking virtual machine 202 starts a new task (step 602). Next, new space manager 212 determines if sufficient memory is available within surplus memory 330 to give the new task a guaranteed amount of memory (step 604).

If sufficient memory is not available within surplus memory 330, new space manager 212 triggers garbage collector 214 to perform garbage collection on one or more task spaces within new generation space 302 to reclaim allocated surplus memory chunks to surplus memory 330 (step 606). If memory is available at 604 or after reclaiming allocated surplus memory at 606, new space manager 212 reserves memory for the new task ending the process (step 608).

Allocating Memory

Figure 7:
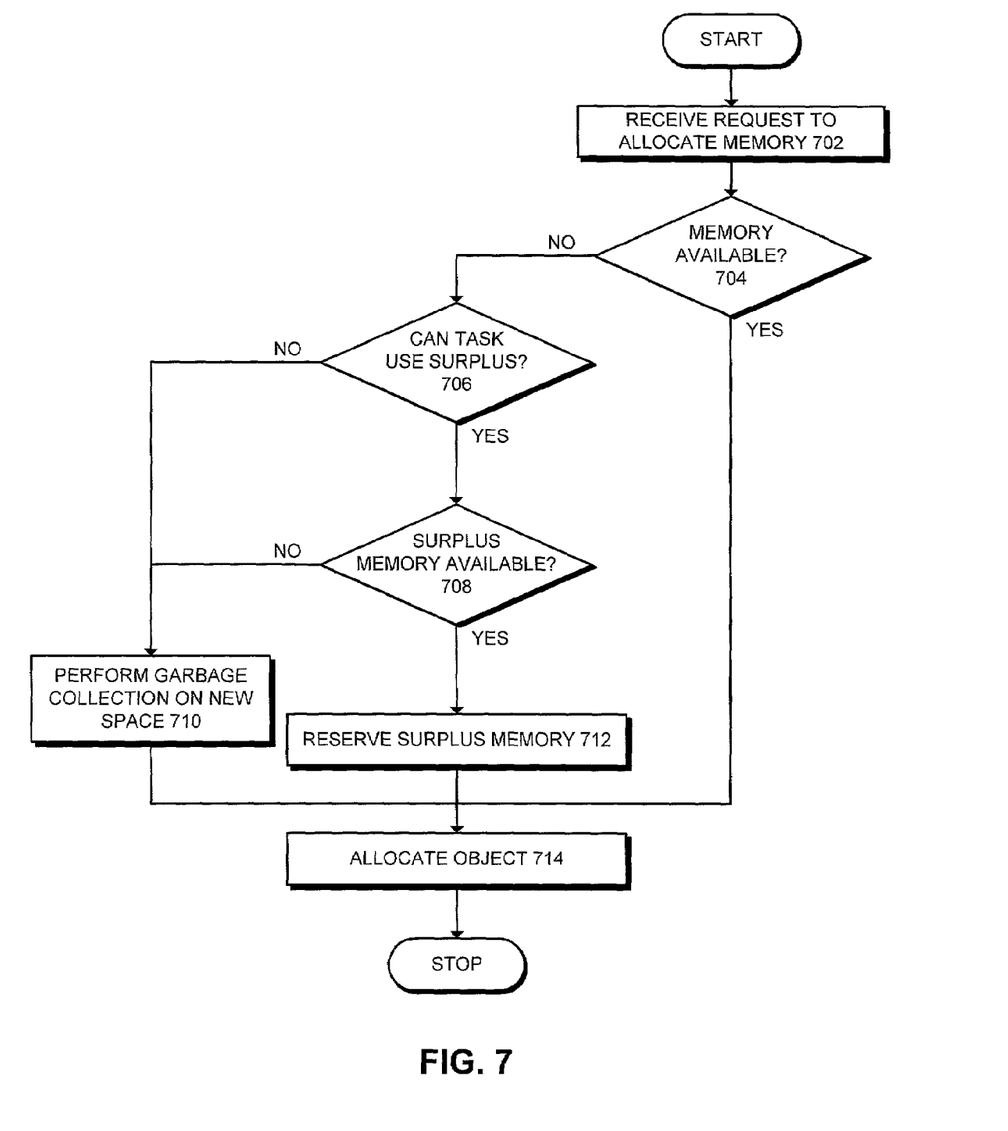
FIG. 7 is a flowchart illustrating the process of allocating reserved memory in accordance with an embodiment of the present invention.

FIG. 7 is a flowchart illustrating the process of allocating reserved memory in accordance with an embodiment of the present invention. The system starts when new space manager 212 receives a request to allocate memory for an object from a task (step 702). Next, new space manager 212 determines if sufficient memory is available within the memory reserved for the task to create the object (step 704).

If there is not sufficient memory available, new space manager 212 then determines if the task has a high enough privilege level to use surplus memory 330 (step 706). If so, new space manager 212 then determines if there is surplus memory available within surplus memory 330 to allocate a surplus chunk to the task (step 708). If there is surplus memory available within surplus memory 330, new space manager 212 reserves a surplus chunk from surplus memory 330 for the task (step 712).

If the task cannot use surplus memory at 706 or if surplus memory is not available at 708, new space manager 212 signals garbage collector 214 to perform garbage collection on the task space within new generation space 302 that is associated with the task to reclaim memory used by dead objects (step 710).

After performing garbage collection at 710, reserving surplus memory at 712, or if memory is available at 704, new space manager 212 allocates memory for the new object (step 714).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing heap memory in a multitasking system, comprising:
   reserving a guaranteed amount of heap memory for a task from a common heap in the multitasking system, wherein the heap memory reserved for the task is separate from heap memory reserved for all other tasks in the common heap of the multitasking system;
   receiving a request from the task to allocate heap memory for a new object; and
   if heap memory is available in the guaranteed amount of heap memory for the task, allocating heap memory for the new object from the guaranteed amount of heap memory;
   if heap memory is not available in the guaranteed amount of heap memory, checking if surplus heap memory is available in the common heap;
   if surplus heap memory is available, reserving an additional amount of heap memory to the task from the common heap and allocating heap memory for the new object from the additional amount of heap memory, whereby allocating heap memory for the new object from the additional amount of heap memory delays garbage collection; and
   if surplus heap memory is not available, performing garbage collection on the heap memory reserved for the task, wherein the task space is separate from all other task spaces;
   wherein other tasks continue normal execution without interruption due to garbage collection.

2. The method of claim 1, wherein if surplus heap memory is not available in the common heap in addition to heap memory allocated to tasks, the method further comprises:
   performing garbage collection on heap memory to reclaim unused reserved heap memory, and
   allocating heap memory for the new object from reclaimed surplus heap memory.

3. The method of claim 1, wherein reserving the guaranteed amount of heap memory from the common heap includes:
   determining if there is sufficient heap memory available in the common heap; and
   if not, performing garbage collection to reclaim allocated surplus heap memory, and
   reserving heap memory for the task from reclaimed heap memory.

4. The method of claim 1, wherein heap memory in the common heap is managed using a generational garbage collector.

5. The method of claim 4, wherein a plurality of tasks share an old generation of the generational garbage collector.

6. The method of claim 5, wherein each task of the plurality of tasks has a new generation of the generational garbage collector belonging to the task.

7. The method of claim 4, wherein the generational garbage collector is a copying garbage collector.

8. A computer-readable storage medium storing instructions that when executed by a computer cause the computer to perform a method for managing heap memory in a multitasking system, wherein the computer-readable storage medium includes magnetic and optical storage devices, disk drives, magnetic tape, CDs (compact discs), and DVDs (digital versatile discs or digital video discs), the method comprising the steps of:
   reserving a guaranteed amount of heap memory for a task from a common heap in the multitasking system, wherein the heap memory reserved for the task is separate from heap memory reserved for all other tasks in the common heap of the multitasking system;
   receiving a request from the task to allocate heap memory for a new object; and
   if heap memory is available in the guaranteed amount of heap memory for the task, allocating heap memory for the new object from the guaranteed amount of heap memory;
   if heap memory is not available in the guaranteed amount of heap memory, checking if surplus heap memory is available in the common heap;
   if surplus heap memory is available, reserving an additional amount of heap memory to the task from the common heap and allocating heap memory for the new object from the additional amount of heap memory, whereby allocating heap memory for the new object from the additional amount of heap memory delays garbage collection; and
   if surplus heap memory is not available, performing garbage collection on the heap memory reserved for the task, wherein the task space is separate from all other task spaces;
   wherein other tasks continue normal execution without interruption due to garbage collection.

9. The computer-readable storage medium of claim 8, wherein if surplus heap memory is not available in the common heap in addition to heap memory allocated to tasks, the method further comprises:
   performing garbage collection on heap memory to reclaim unused reserved heap memory, and
   allocating heap memory for the new object from reclaimed surplus heap memory.

10. The computer-readable storage medium of claim 8, wherein reserving the guaranteed amount of heap memory from the common heap includes:
    determining if there is sufficient heap memory available in the common heap; and
    if not, performing garbage collection to reclaim allocated surplus heap memory, and
    reserving heap memory for the task from reclaimed heap memory.

11. The computer-readable storage medium of claim 8, wherein heap memory in the common heap is managed using a generational garbage collector.

12. The computer-readable storage medium of claim 11, wherein a plurality of tasks share an old generation of the generational garbage collector.

13. The computer-readable storage medium of claim 12, wherein each task of the plurality of tasks has a new generation of the generational garbage collector belonging to the task.

14. The computer-readable storage medium of claim 11, wherein the generational garbage collector is a copying garbage collector.

15. An apparatus that facilitates managing computer heap memory in a multitasking system, comprising:
- a computing device including a multitasking virtual machine;
- a reserving mechanism within the multitasking virtual machine that is configured to reserve a guaranteed amount of physical heap memory for a task from a new generation space within a common heap in the multitasking system, wherein the heap memory reserved for the task is separate from heap memory reserved for all other tasks in the common heap of the multitasking system;
- a receiving mechanism within the multitasking virtual machine that is configured to receive a request from the task to allocate heap memory for a new object;
- the reserving mechanism that is further configured to reserve an additional amount of heap memory to the task from the common heap;
- an allocating mechanism within the multitasking virtual machine that is configured to allocate heap memory for the new object from the guaranteed amount of heap memory;
- a reserving mechanism configured to reserve an additional amount of heap memory to the task from surplus memory within the common heap, if heap memory is not available in the guaranteed amount of heap memory;
- wherein the allocating mechanism is further configured to allocate heap memory for the new object from the additional amount of heap memory, whereby allocating heap memory for the new object from the additional amount of heap memory delays garbage collection; and
- a garbage collection mechanism configured to perform garbage collection on the heap memory reserved for the task, wherein the task space is separate from all other task spaces;
- wherein other tasks continue normal execution without interruption due to garbage collection.

16. The apparatus of claim 15, further comprising:
- a garbage collecting mechanism that is configured to perform a garbage collection on heap memory to reclaim unused reserved heap memory, and
- the allocating mechanism that is further configured to allocate heap memory for the new object from reclaimed heap memory.

17. The apparatus of claim 15, further comprising:
- a determining mechanism that is configured to determine if there is sufficient heap memory available in the common heap; and
- a garbage collection mechanism that is configured to perform a garbage collection to reclaim allocated surplus heap memory, and
- the reserving mechanism that is further configured to reserve heap memory for the task from reclaimed heap memory.

18. The apparatus of claim 15, further comprising a generational garbage collector.

19. The apparatus of claim 18, wherein a plurality of tasks share an old generation of the generational garbage collector.

20. The apparatus of claim 19, wherein each task of the plurality of tasks has a new generation of the generational garbage collector belonging to the task.

21. The apparatus of claim 18, wherein the generational garbage collector is a copying garbage collector.

* * * * *